US012191719B2

United States Patent
Chien et al.

(10) Patent No.: US 12,191,719 B2
(45) Date of Patent: Jan. 7, 2025

(54) MOTOR

(71) Applicant: Delta Electronics, Inc., Taoyuan (TW)

(72) Inventors: Chih-Yu Chien, Taoyuan (TW); Chien-Ho Lee, Taoyuan (TW); Yi-Ta Lu, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 269 days.

(21) Appl. No.: 17/981,369

(22) Filed: Nov. 4, 2022

(65) Prior Publication Data

US 2023/0053832 A1 Feb. 23, 2023

Related U.S. Application Data

(63) Continuation-in-part of application No. 16/905,706, filed on Jun. 18, 2020, now Pat. No. 11,626,768.

(60) Provisional application No. 62/863,403, filed on Jun. 19, 2019.

(30) Foreign Application Priority Data

Jun. 16, 2022 (CN) .......................... 202221511432.5

(51) Int. Cl.
*H02K 11/30* (2016.01)
*H02K 1/16* (2006.01)
*H02K 11/00* (2016.01)

(52) U.S. Cl.
CPC ............... *H02K 11/30* (2016.01); *H02K 1/16* (2013.01); *H02K 11/0094* (2013.01); *H02K 2211/03* (2013.01)

(58) Field of Classification Search
CPC ...... H02K 1/16; H02K 11/0094; H02K 11/30; H02K 11/33; H02K 21/22; H02K 2203/03; H02K 2211/03; H02K 3/522; H02K 5/10; H02K 5/225
See application file for complete search history.

(56) References Cited

U.S. PATENT DOCUMENTS

| | | | |
|---|---|---|---|
| 7,939,978 B2 | 5/2011 | Best et al. | |
| 8,531,065 B2 | 9/2013 | Knorr et al. | |
| 9,531,239 B2 | 12/2016 | Maschke et al. | |
| 9,806,567 B2 | 10/2017 | Lee et al. | |
| 2006/0006094 A1* | 1/2006 | Hofmann | H02K 29/08 206/706 |

(Continued)

FOREIGN PATENT DOCUMENTS

JP 2002345211 A 11/2002

*Primary Examiner* — Naishadh N Desai
(74) *Attorney, Agent, or Firm* — KIRTON McCONKIE; Evan R. Witt

(57) ABSTRACT

The present disclosure provides a motor including a stator, a rotor and a first circuit board. The stator includes a winding assembly including a plurality of coils. A conductive element is extended out from the winding assembly and is electrically connected to a first electrical connector. The first electrical connector penetrates through a pillow of the stator and is electrically connected to the first circuit board. The motor further includes a second circuit board electrically connected to the first circuit board, and a first insulation plate, a second insulation plate and a third insulation plate for fixing and protecting the circuit boards. The motor also includes a clip for fixing and heat dissipating an electronic component disposed on the second circuit board.

9 Claims, 19 Drawing Sheets

(56) References Cited

U.S. PATENT DOCUMENTS

2015/0340923 A1* 11/2015 Lee ...................... F04D 29/325
                                                      310/68 B
2020/0403478 A1* 12/2020 Lu ........................... H02K 9/06

* cited by examiner

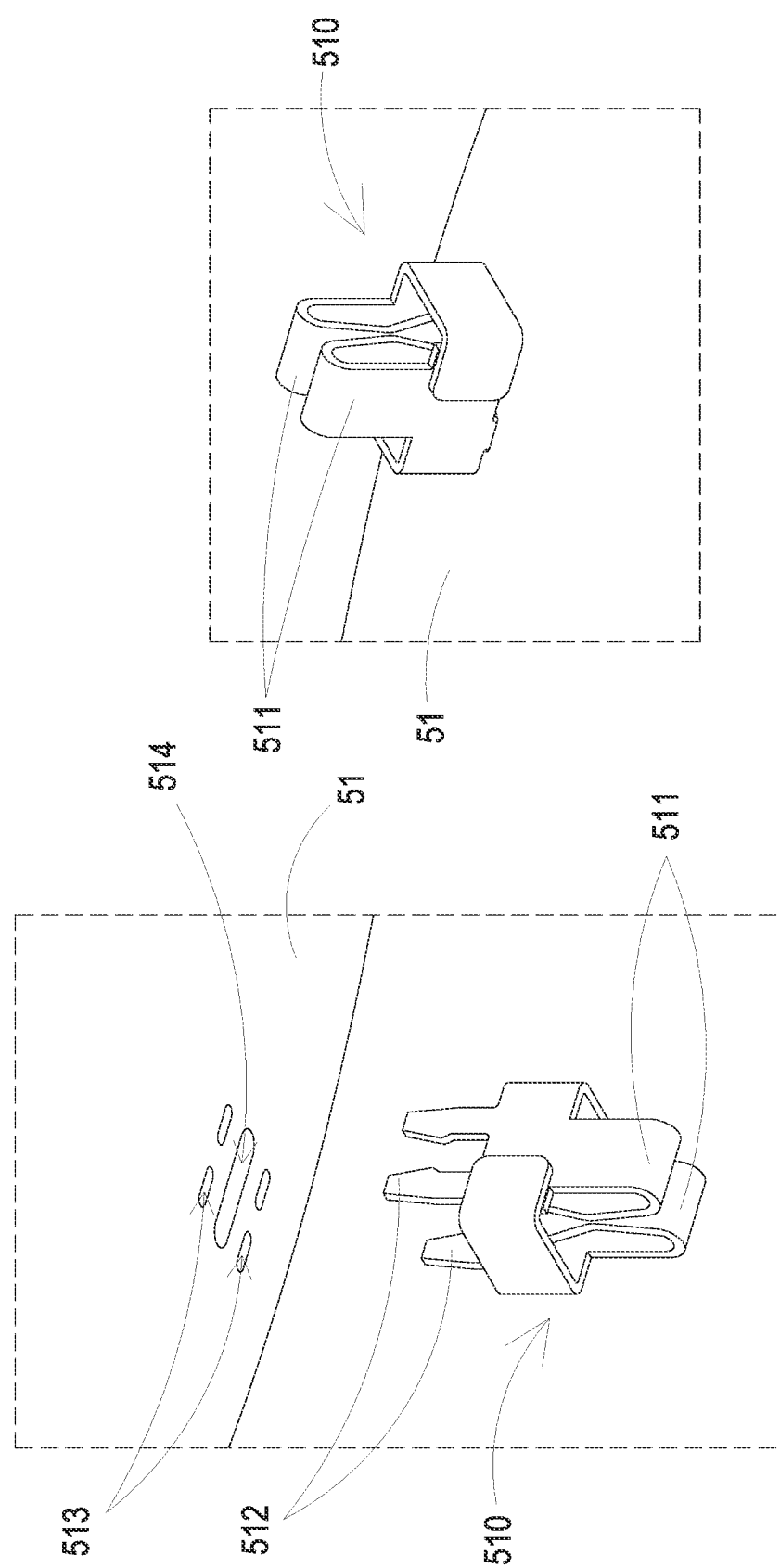

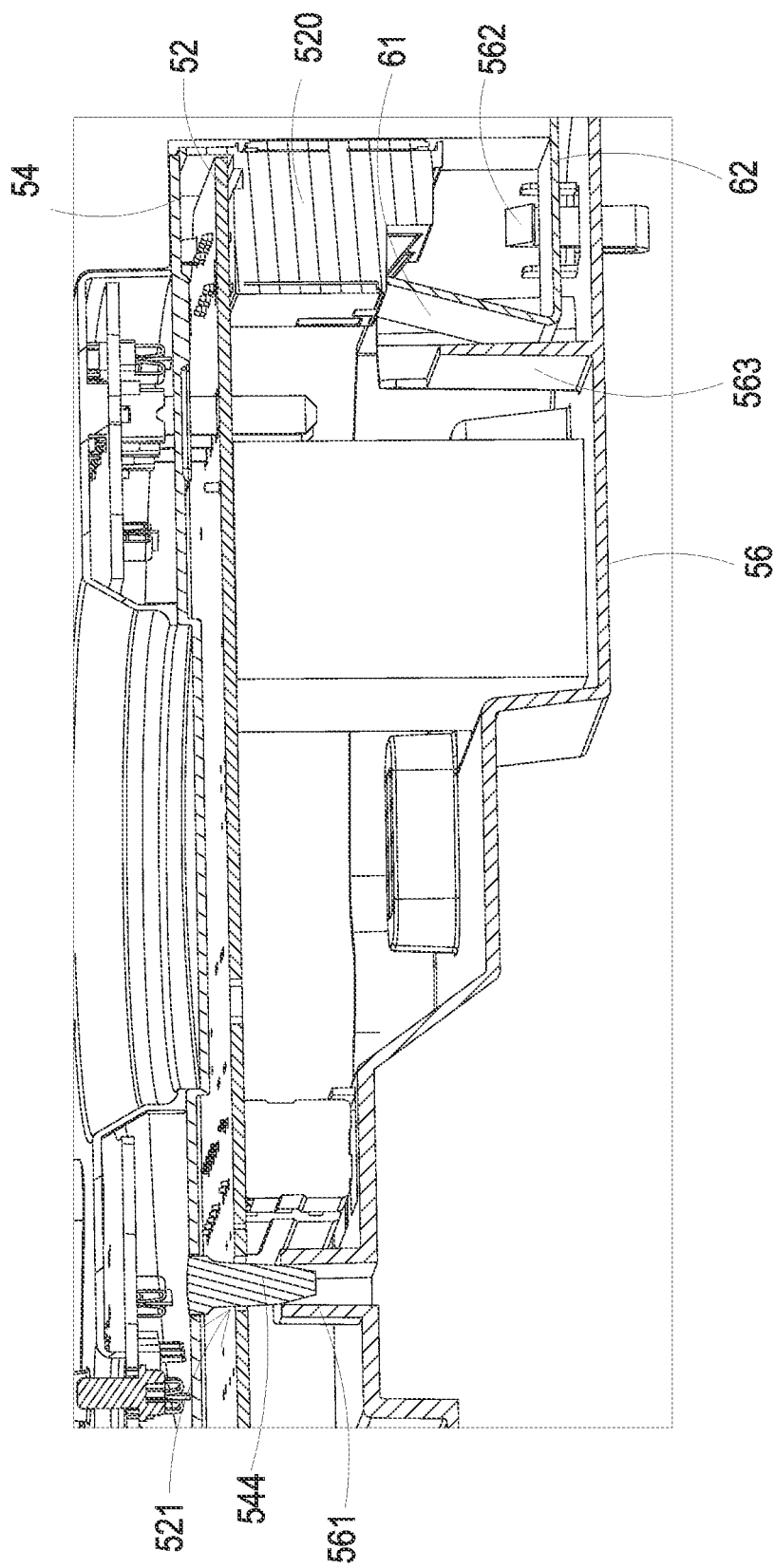

MOTOR

CROSS-REFERENCE TO RELATED APPLICATION

This application is a continuation-in-part application of U.S. application Ser. No. 16/905,706 filed on Jun. 18, 2020 and entitled "MOTOR", which claims the benefit of U.S. Provisional Application No. 62/863,403 filed on Jun. 19, 2019, entitled "FAN". This application also claims priority to China Patent Application No. 202221511432.5 filed on Jun. 16, 2022. The entire contents of the above-mentioned patent applications are incorporated herein by reference for all purposes.

FIELD OF THE INVENTION

The present disclosure relates to a motor, and more particularly to a motor using a circuit board to replace the conventional wire binding plate.

BACKGROUND OF THE INVENTION

Motor is a kind of electric machine that generates induction magnetism by providing electrical energy to the coil on the stator and further makes the rotor rotate. It is an important topic to simplify the complexity of assembling motor in the current development.

In the stator structure of conventional motor, the steps of assembling the wire binding plate are complicated and cumbersome, which may easily lead to wire binding errors. Moreover, the wire binding plate and the coil of the winding assembly are easy to cause short circuit problems during installation.

In addition, when the motor is used for general or outdoor applications, the rotor is susceptible to moisture at the rotating position. When the stator inside the rotor is further electrically connected to the wire binding plate and the circuit board, a structure for blocking moisture is required.

Therefore, there is a need of providing a motor to obviate the drawbacks encountered from the prior arts.

SUMMARY OF THE INVENTION

It is an objective of the present disclosure to provide a motor to simplify the steps and complexity of assembling motor by replacing the conventional wire binding plate with the circuit board.

It is another objective of the present disclosure to provide a motor. A waterproof element is disposed in the insertion hole of the plate of the pillow of the motor. The waterproof element is configured for a first electrical connector to penetrate therethrough, and the waterproof element surrounds the first electrical connector to achieve waterproof and insulation functions.

It is another objective of the present disclosure to provide a motor in which a clip is utilized to dissipate heat generated from an electronic component disposed on the circuit board.

To achieve the above purpose, a motor is provided. A stator of the motor includes a winding assembly, a pillow and a cover. A conductive element is extended out from the coil of the winding assembly, and the conductive element is connected to the first electrical connector. The pillow has a shaft tube and a plate. The shaft tube is disposed on the plate. The winding assembly is disposed circumferentially on the shaft tube. The cover is used for covering a side of the pillow opposite to the shaft tube. The plate has an inner side. A first insertion hole is disposed on the inner side of the plate and is configured for the first electrical connector to penetrate therethrough. A first circuit board is disposed on an opposite side of the plate relative to the shaft tube. The first circuit board is electrically connected to the winding assembly through the first electrical connector. A second circuit board is disposed at a side of the first circuit board facing the cover and is electrically connected to the first circuit board. A first insulation plate is disposed between the plate and the first circuit board, a second insulation plate is disposed between the first circuit board and the second circuit board, and a third insulation plate is disposed between the second circuit board and the cover. An electronic component disposed on the second circuit board is further contacted with the pillow through a clip.

In the present disclosure, the waterproof element is partially disposed in the first insertion hole. Therefore, the moisture at a side, where the shaft tube is disposed, of the pillow is avoided affecting the first circuit board at the other side of the pillow through the first through hole when the first electrical connector penetrates through the plate.

Moreover, the functions of the first circuit board are similar to those of the wire binding plate of the conventional motor, and the first circuit board can be a winding structure or a printed circuit board. The first circuit board does not include open-loop and closed-loop control components and electronic commutation components for the motor. The first electrical connector is extended out from each of the coils. As long as a simple alignment assembly is performed, the winding assembly can be electrically connected to the first circuit board through the first electrical connector, which can simplify the manufacturing process.

In accordance with an embodiment of the present disclosure, the second circuit board functions as the circuit board in the conventional motor. The second circuit board is provided with electronic commutation components for driving the integrated circuit and the motor.

In accordance with an embodiment of the present disclosure, the pillow further includes a cylinder extending axially from the plate, and the cylinder and the plate form an accommodating space for accommodating the first circuit board, the second circuit board, the first insulation plate, the second insulation plate and the third insulation plate.

In accordance with an embodiment of the present disclosure, a clamp is disposed on the first circuit board, and is configured for clamping the first electrical connector to electrically connect the first circuit board and the winding assembly.

In accordance with an embodiment of the present disclosure, the clip is a single-piece metal including an abutting portion, a holding portion and a clipping portion. The abutting portion and the clipping portion are positioned at opposite sides of the holding portion and approximately facing each other.

BRIEF DESCRIPTION OF THE DRAWINGS

FIG. 6B is a schematic enlarged view of the square A of FIG. 6A;

FIG. 6C is a schematic view illustrating a clamp of FIG. 6B according to another embodiment of the present disclosure;

FIG. 16C is a schematic cross-sectional view illustrating a part of the combination of the clip, the third insulation plate and the electronic component.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
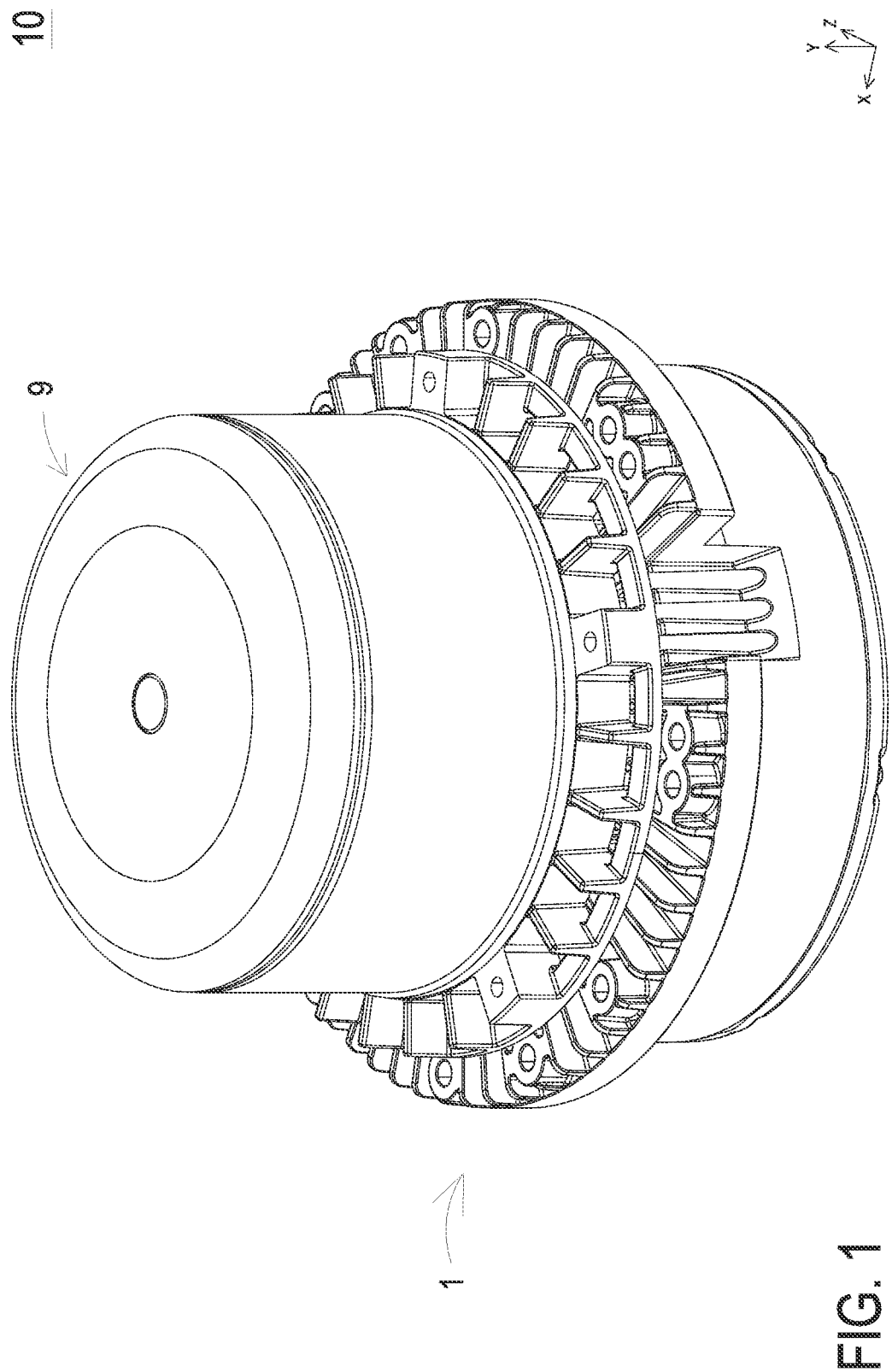
FIG. 1 is a schematic perspective view illustrating a motor according to an embodiment of the present disclosure.
Figure 2:
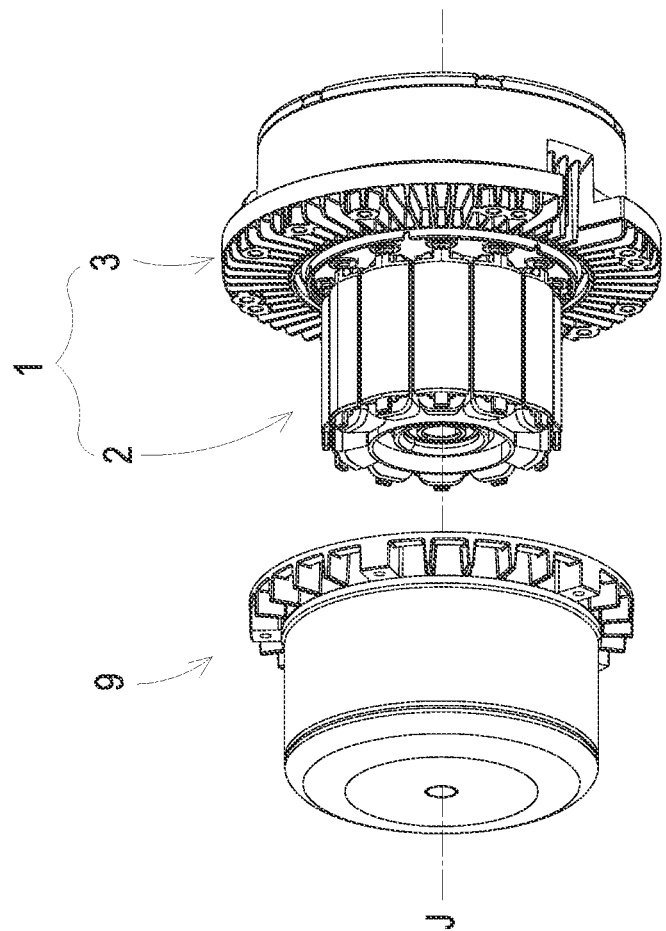
FIG. 2 is a schematic exploded view of the motor of FIG. 1.

Please refer to FIGS. 1 and 2. FIG. 1 is a schematic perspective view illustrating a motor 10 according to an embodiment of the present disclosure. FIG. 2 is a schematic exploded view of the motor 10 of FIG. 1. The motor 10 includes a stator 1 and a rotor 9. The stator 1 includes a winding assembly 2 and a pillow 3. The rotor 9 is sleeved on the winding assembly 2, and the rotor 9 rotates along a central axis J. In other words, the rotor 9 is disposed circumferentially with respect to the central axis J.

In the figures of the present disclosure, the axial direction is assumed to be the direction in which the central axis J of the stator 1 extends. The direction parallel or substantially parallel to the central axis is referred to by the term "axial" or "axially". With the central axis as the center, the directions away from the central axis are simply referred to as the term "radial" or "radially", and the circumferential direction around the central axis is simply referred as the term "circumferential" or "circumferentially".

Figure 3:
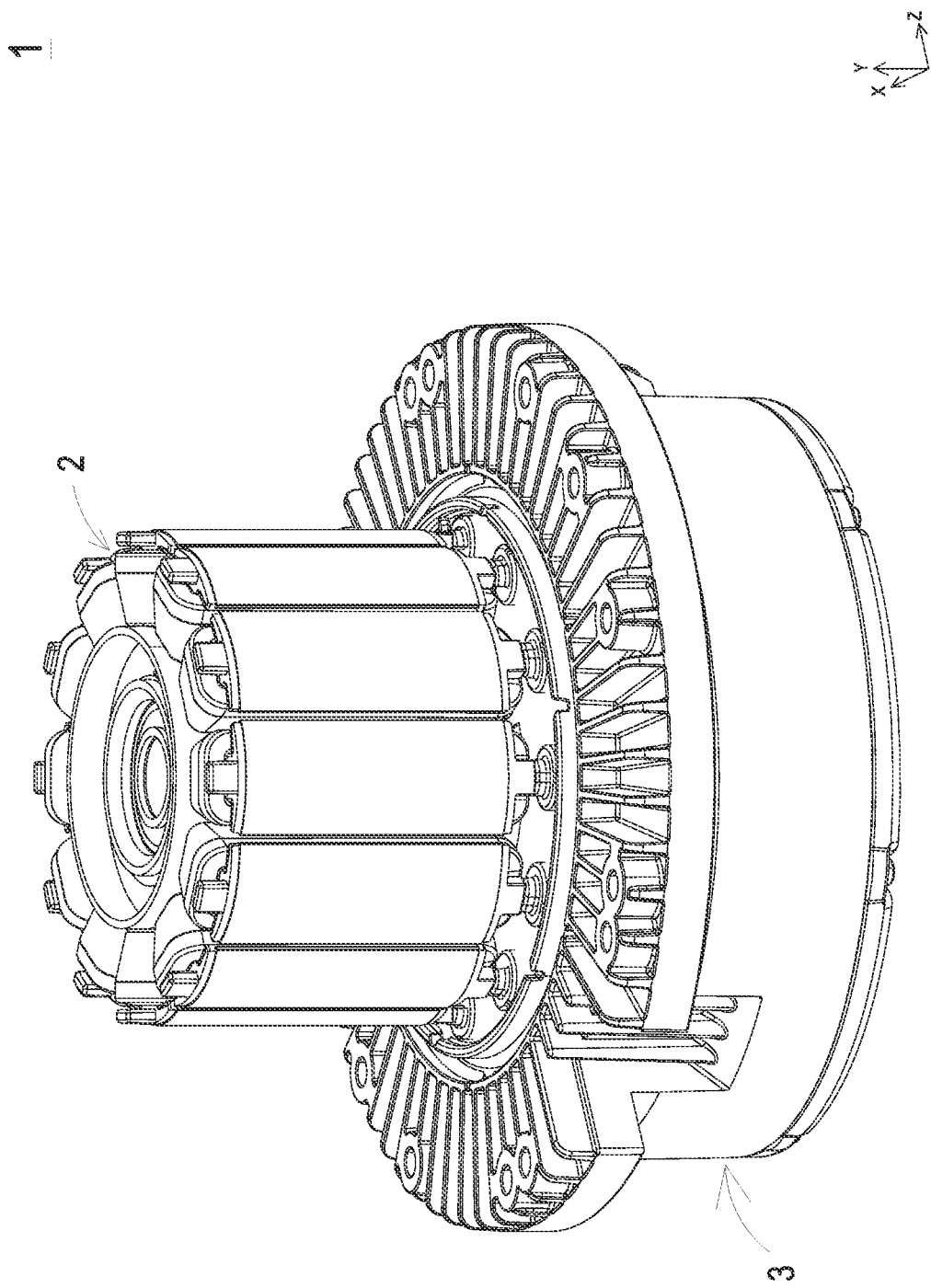
FIG. 3 is a schematic perspective view illustrating a stator of the motor according to an embodiment of the present disclosure.
Figure 4:
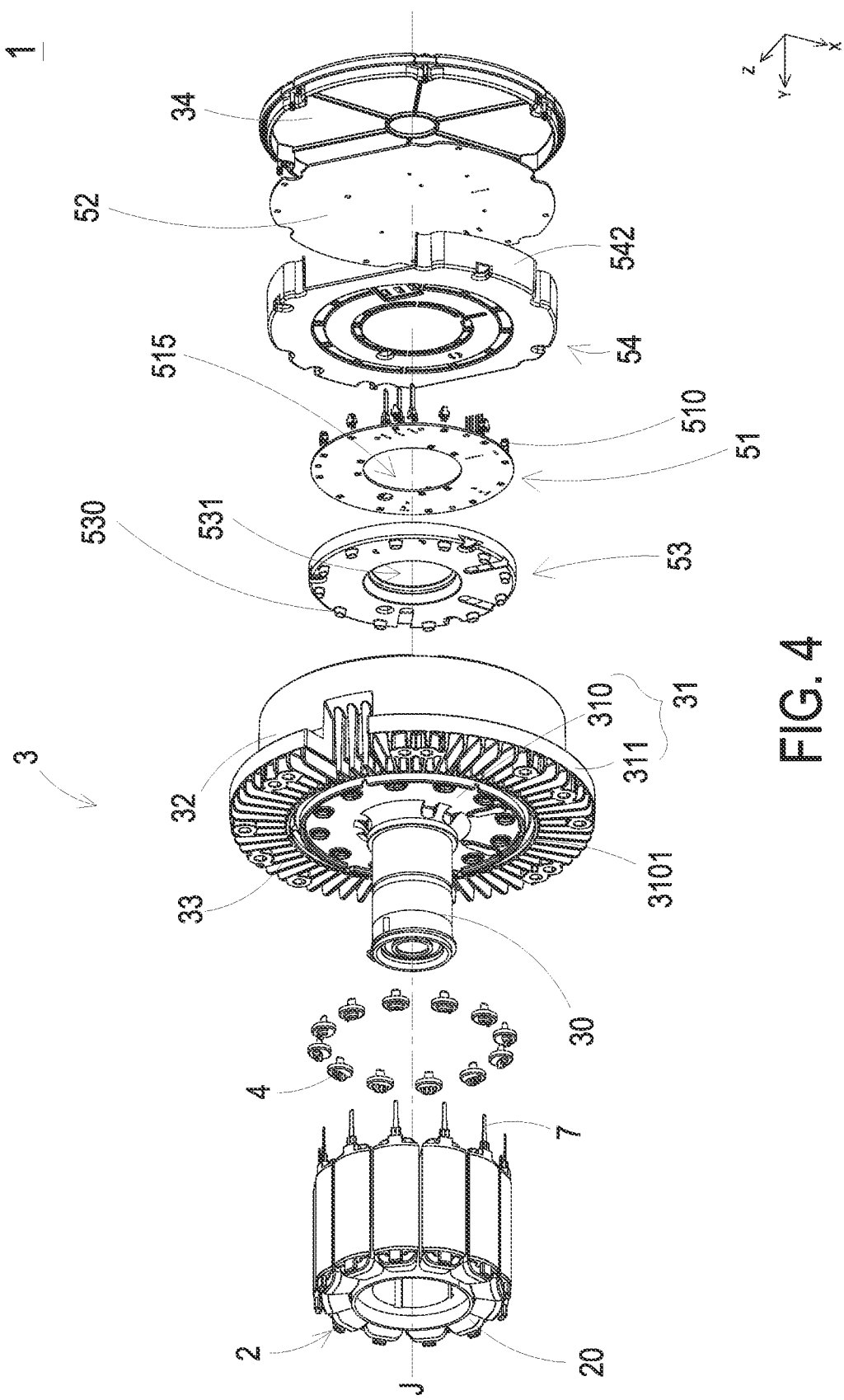
FIG. 4 is a schematic exploded view of the stator of the motor of FIG. 3.
Figure 5:
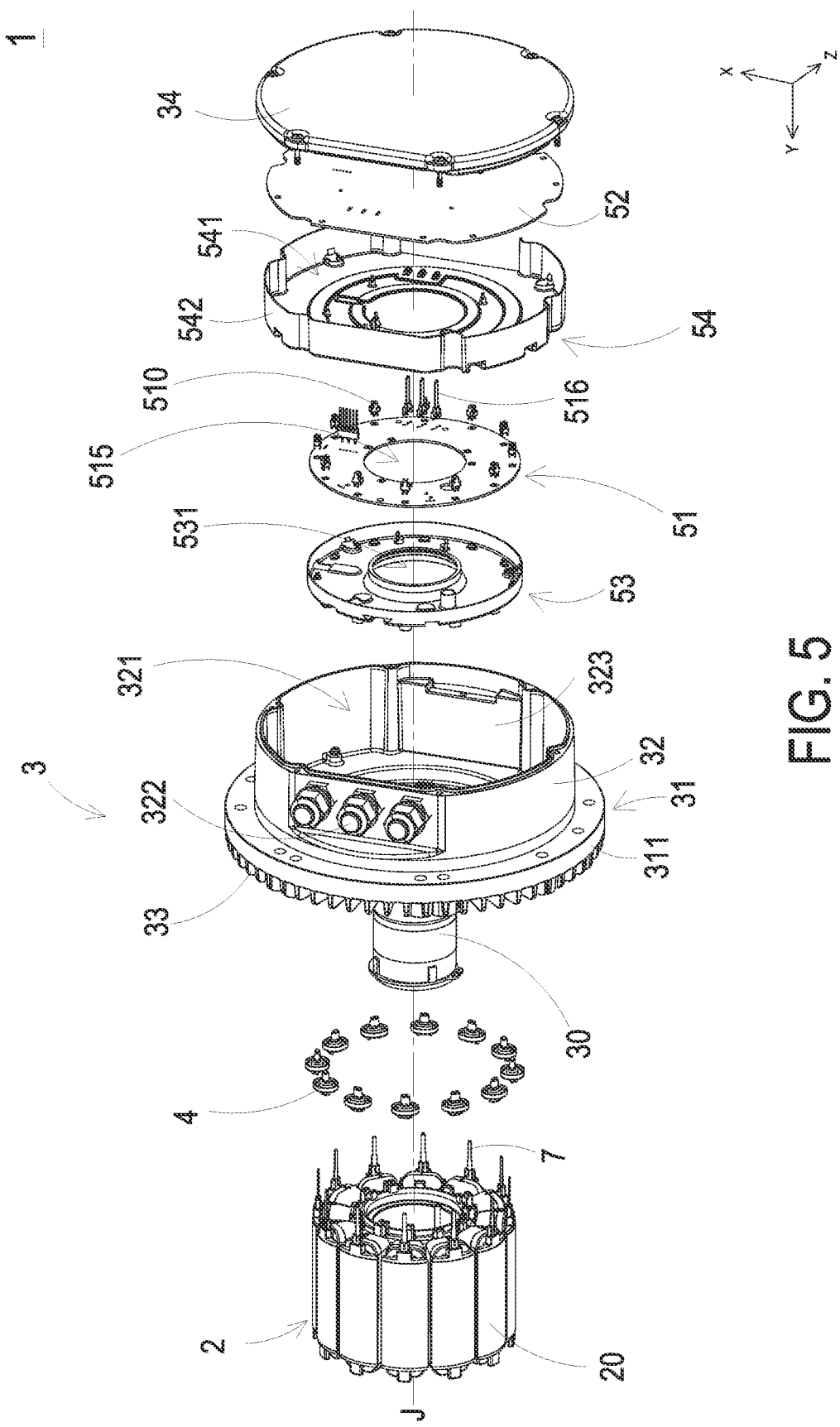
FIG. 5 is a schematic exploded view of the stator of motor of FIG. 3 at another viewing angle.

Please refer to FIGS. 3, 4 and 5. FIG. 3 is a schematic perspective view illustrating a stator 1 of the motor 10 according to an embodiment of the present disclosure. FIG. 4 is a schematic exploded view of the stator 3 of FIG. 3. FIG. 5 is a schematic exploded view of the stator 1 of FIG. 3 at another viewing angle. The stator 1 includes a winding assembly 2 and a pillow 3. The pillow 3 includes a shaft tube 30 and a plate 31. The shaft tube 30 is disposed on a side of the pillow 3 connected to the rotor 9. The winding assembly 2 is disposed circumferentially on the shaft tube 30. The plate 31 has an inner side 310 neighboring to the shaft tube 30 and a flange 311 disposed circumferentially on the inner side 310. A heat dissipation member 33 is disposed on a side of the flange 311 of the plate 31 facing the shaft tube 30. Substantially, the heat dissipation member 33 extends axially with respect to the flange 311 of the plate 31 and extends radially with respect to the shaft tube 30. A first insertion hole 3101 is disposed on the inner side 310 of the plate 31. A waterproof element 4 is at least partially disposed in the first insertion hole 3101. The winding assembly 2 has a plurality of coils 20, for example, the number of coils 20 is greater than 3 and is a multiple of 3, and a conductive element is extended out from each coil 20 and is connected to a first electrical connector 7. The first electrical connector 7 penetrates through the waterproof element 4 and the first insertion hole 3101. An end of the first electrical connector 7 is located at an opposite side of the plate 31, which is opposite to the side where the shaft tube 30 is disposed. The conductive elements are extended out from the plurality of coils 20 respectively, and each conductive element is electrically connected to the corresponding first electrical connector 7 directly. Alternatively, the coils with the same phase are electrically connected to each other, and then connected to the first electrical connector 7 via the same conductive element.

The pillow 3 further includes a cylinder 32 disposed on the opposite side of the plate 31 relative to the shaft tube. The cylinder 32 is substantially a cylindrical structure extending axially, and the cylinder 32 forms a first space 321. A first circuit board 51 is disposed in the first space 321. A clamp 510 is disposed on the first circuit board 51, and a first opening 515 is disposed at the center of the first circuit board 51. The first electrical connector 7 extended from the coil 20 penetrates the plate 31 through the first insertion hole 3101, and is contacted with the clamp 510 on the first circuit board 51. Accordingly, the coil 20 is electrically connected to the first circuit board 51 through the first electrical connector 7. The number of the first insertion hole 3101 is basically the same as that of the first electrical connector 7. Furthermore, the number of the clamp 510 is also the same as that of the first electrical connector 7. In addition, the cylinder 32 has waterproof joints 322 disposed thereon for external connections, and a flat region 323 concavely and inwardly formed thereon, as shown in FIG. 5.

Generally, the entire pillow 3 is a metal structure. A first insulation plate 53 is disposed between the pillow 3 and the first circuit board 51. An insertion body 530 is disposed on the first insulation board 53 and is corresponding to the first insertion hole 3101. A second opening 531 is disposed at the center of the first insulation plate 53. The insertion body 530 has a perforation aligned with the first insertion hole 3101 for allowing the first electrical connector 7 to penetrate therethrough.

Please continue referring to FIGS. 4 and 5. A second circuit board 52 is further disposed in the first space 321 formed by the cylinder 32. A second insulation board 54 is disposed between the first circuit board 51 and the second circuit board 52. A side wall 542 is extended axially from the periphery of the second insulation plate 54 and forms a second space 541. The second circuit board 52 is disposed in the second space 541. The stator 1 further includes a cover 34 connected to the cylinder 32. Consequently, the first space 321 is substantially an enclosed space for accommodating the first insulation board 53, the first circuit board 51, the second insulation board 54 and the second circuit board 52.

In this embodiment, the second circuit board 52 has the same function as the circuit board of the conventional motor with electronic commutation components disposed thereon for driving the integrated circuit, and the first circuit board 51 has the same function as the wire binding plate of the conventional motor. Generally, the first circuit board 51 does not include open-loop and closed-loop control components and electronic commutation components for the motor.

Figure 6A:
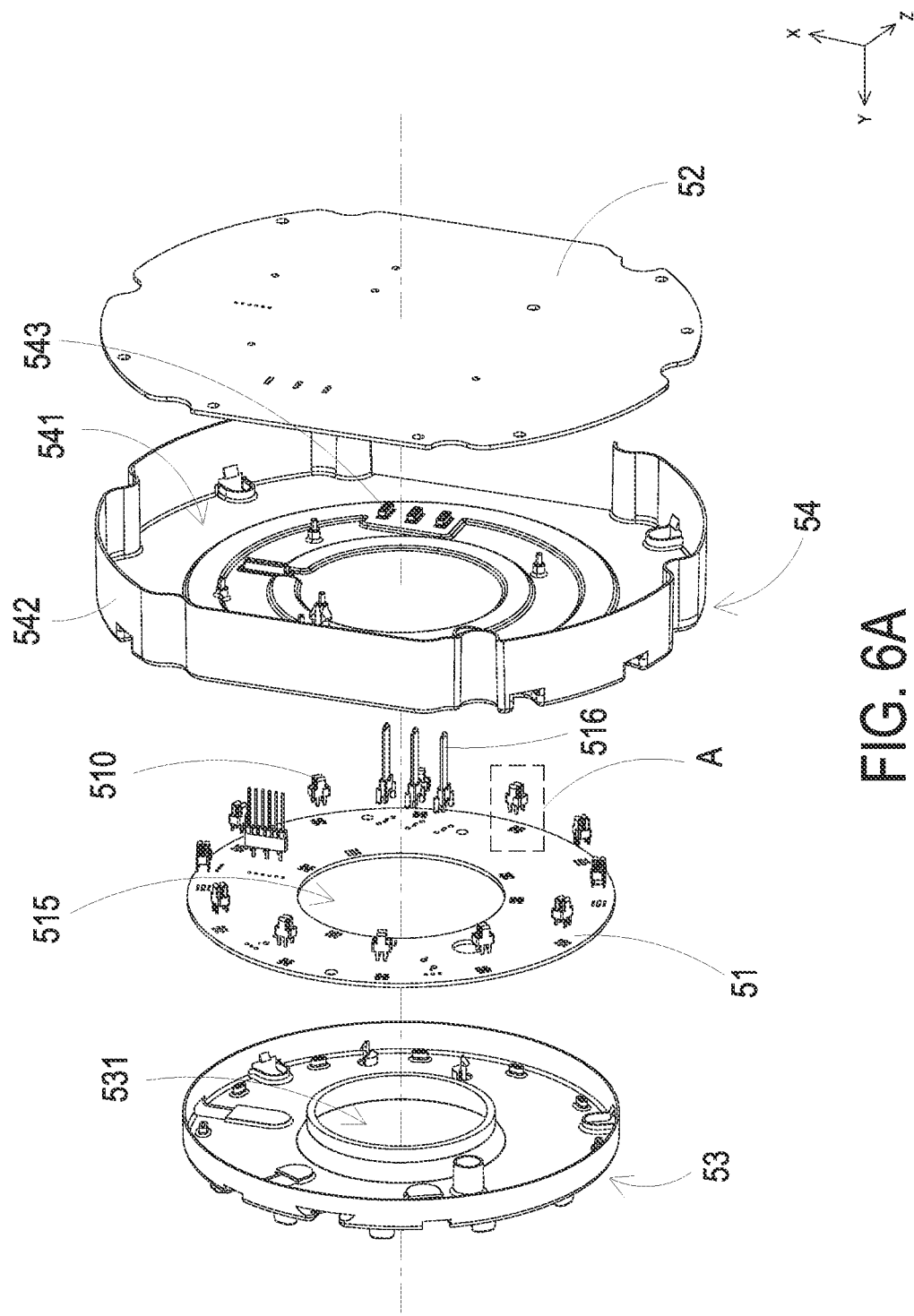
FIG. 6A is a schematic exploded view illustrating the circuit boards and the insulation plates of FIG. 5.

FIG. 6A is a schematic exploded view illustrating the two circuit boards and the two insulation plates in FIG. 5. Please refer to the FIGS. 5 and 6A, the first opening 515 of the first circuit board 51 and the second opening 531 of the first insulation plate 53 are axially aligned with each other, so that a shaft (not shown) is allowed to penetrate through the first opening 515 and the second opening 531. A second electrical connector 516 is disposed on the first circuit board 51, and the second electrical connector 516 penetrates through a second insertion hole 543 disposed on the second insulation board 54. Therefore, the first circuit board 51 and the second circuit board 52 are electrically connected to each other through the second electrical connector 516.

In FIG. 6A, the type of the second electrical connector 516 is a metal pin, but not limited thereto.

FIG. 6B is a schematic enlarged view of square A of FIG. 6A. Please refer to FIGS. 6A and 6B, the clamp 510 disposed on the first circuit board 51 is a conductive element including a clamping part 511 and an engaging part 512. The engaging part 512 penetrates through an engaging hole 513 of the first circuit board 51 correspondingly, and the clamp 510 is fixed on the first circuit board 51 and is electrically connected to the first circuit board 51. The clamping part 511 has two metal components, which can clamp the first electrical connector 7 shown in FIG. 5. The first circuit board 51 further includes a penetrating hole 514 corresponding to the clamping part 511. When the clamping part 511 clamps the first electrical connector 7, the penetrating hole 514 can be selectively provided for the first electrical connector 7 to penetrate therethrough.

In the embodiment shown in FIGS. 6A and 6B, the clamp 510 is disposed on a side of the first circuit board 510 neighboring to the second circuit board 52, which is the side away from the shaft tube 30, but not limit thereto.

Please continue referring to FIG. 6C. FIG. 6C is a schematic view illustrating the clamp 510 of FIG. 6B according to another embodiment of the present disclosure. The clamp 510 of the FIG. 6C is disposed on a side of the first circuit board 51 neighboring to the first insulation board 53, which is the side facing the shaft tube 30. In short, the clamp 510 serves as a connector electrically connected to the first circuit board 51, and the clamp 510 is configured to electrically connect the first electrical connector 7 to the first circuit board 51.

Figure 7B:
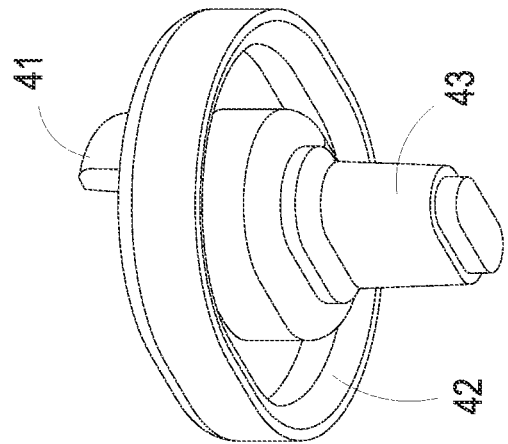
FIG. 7B is a schematic perspective view illustrating the waterproof element of FIG. 7A at another viewing angle.
Figure 7A:
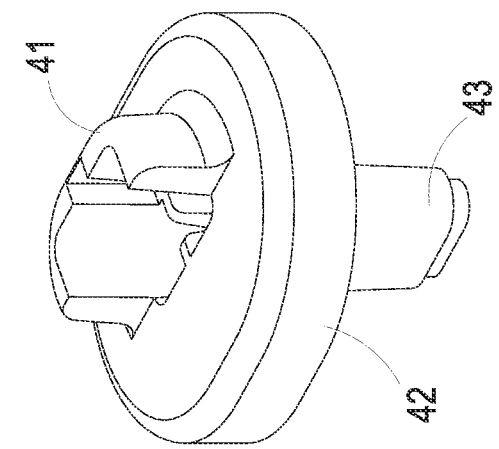
FIG. 7A is a schematic perspective view illustrating a waterproof element according to an embodiment of the present disclosure.

FIG. 7A is a schematic perspective view illustrating a waterproof element 4 according to an embodiment of the present disclosure. FIG. 7B is a schematic perspective view illustrating the waterproof element 4 of FIG. 7A at another viewing angle. Please refer to FIGS. 7A and 7B, the waterproof element 4 is a waterproof structure at least partially disposed in the first insertion hole 3101, and is configured for allowing the first electrical connector 7 to penetrate therethrough. The waterproof element 4 includes an airtight part 41, a positioning part 42 and an extension part 43. Preferably but not exclusively, the waterproof element 4 is made of rubber or plastic. When the waterproof element 4 is disposed, the extension part 43 is inserted into the first insertion hole 3101, and the airtight part 41 and the positioning part 42 are disposed on the inner side 310 of the plate 31 neighboring to the shaft tube 30.

Figure 8:
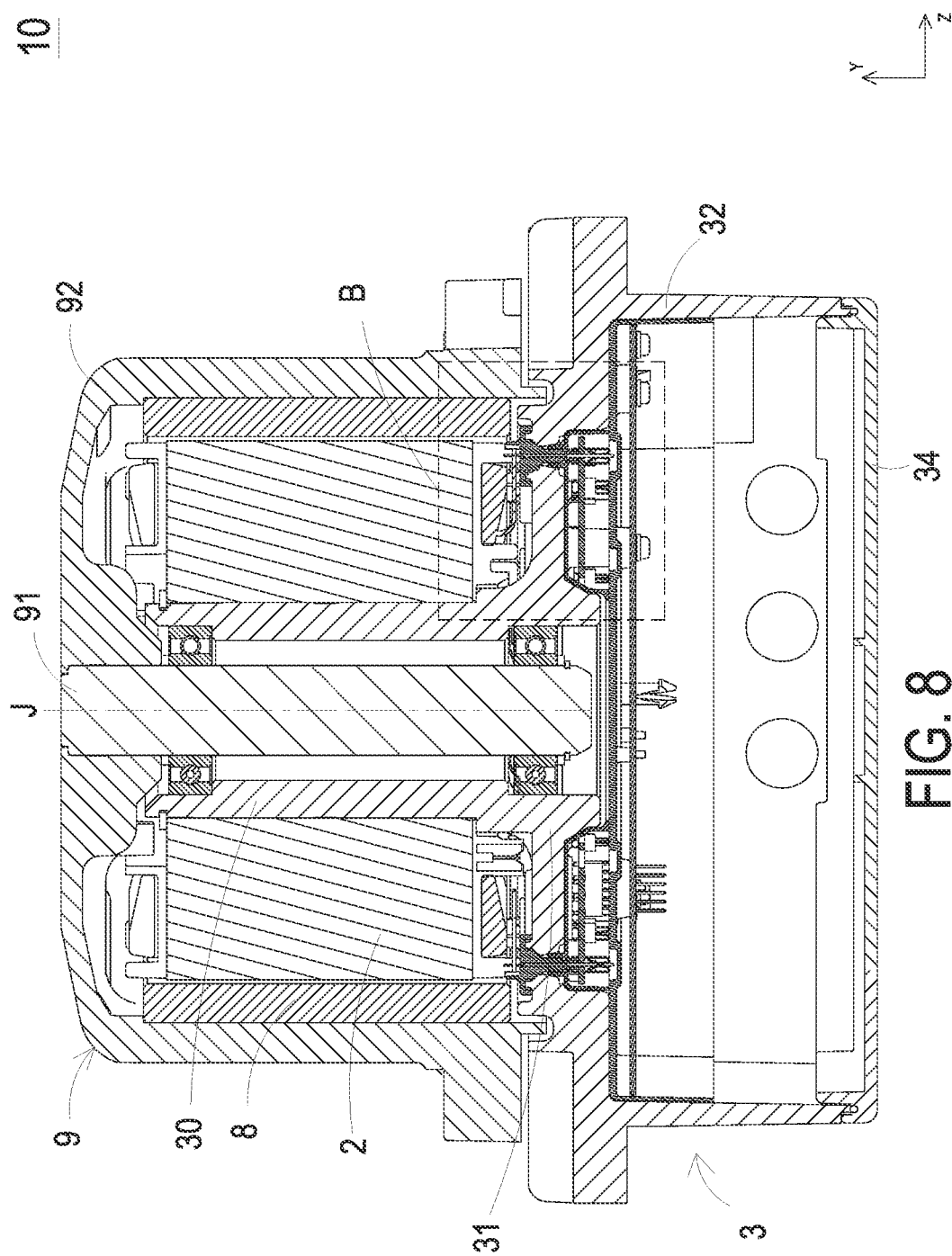
FIG. 8 is a schematic cross-sectional view showing the motor of FIG. 1.

Please refer to FIG. 8. FIG. 8 is a schematic cross-sectional view showing the motor 10 in FIG. 1. The winding assembly 2 is disposed circumferentially on the pillow 3 around the shaft tube 30. The rotor 9 includes a shaft 91 and a hub 92 connected to the shaft 91. The shaft 91 is disposed in the shaft tube 30, and a magnet 8 is disposed inside the hub 92 corresponding to the winding assembly 2. The shaft 91 drives the rotor 9 to rotate along the central axis J. The motor 10 of the present disclosure is an external-rotor motor in which the rotor 9 is circumferentially disposed at the outside of the winding assembly 2 of the stator 1, so as to form a rotation structure with the rotor 9 located at the outer side and the stator 1 located at the inner side.

Figure 9:
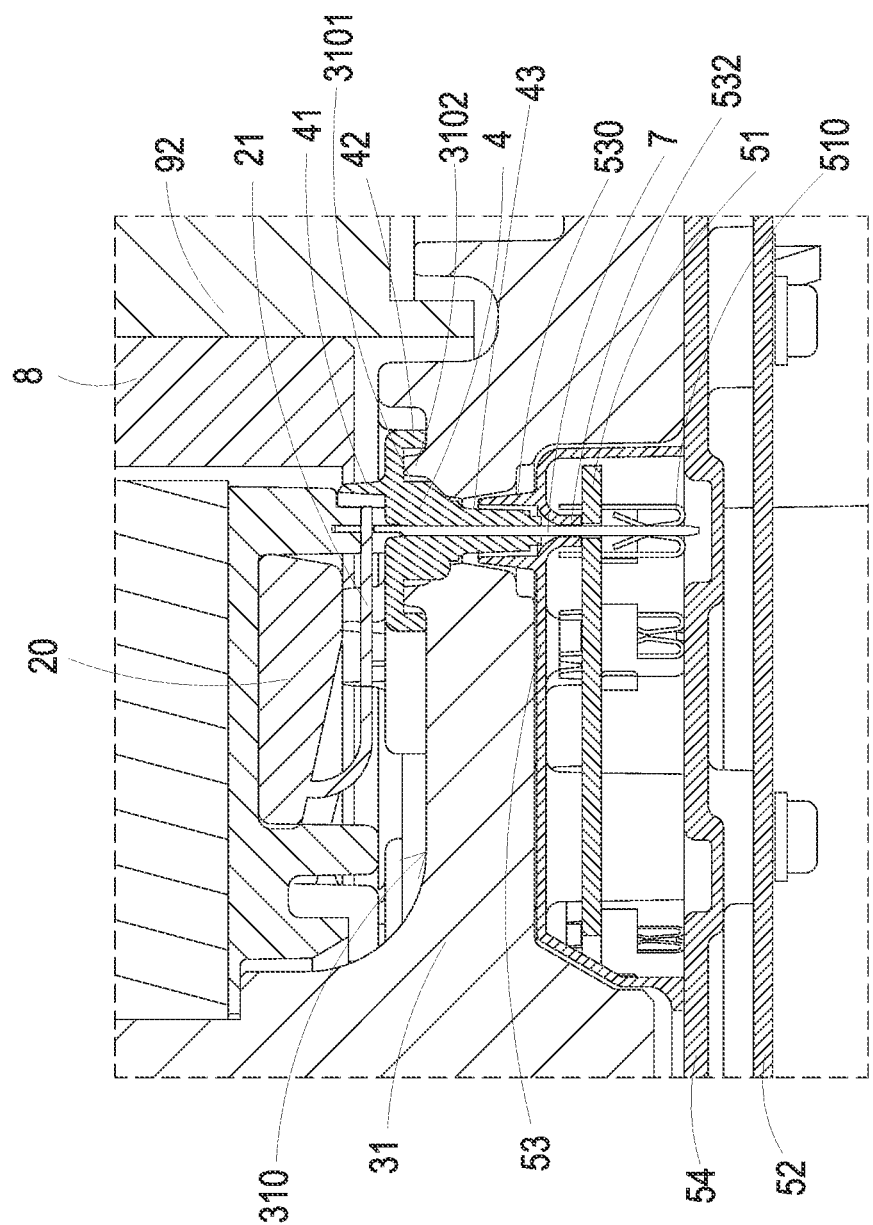
FIG. 9 is a schematic enlarged view of the square B of FIG. 8.

FIG. 9 is a schematic enlarged view of square B of FIG. 8. Please continue referring to FIGS. 8 and 9, the first electrical connector 7 is extended out from the coil 20 of the winding assembly 2, and the first electrical connector 7 penetrates through the first insertion hole 3101 at the inner side of the pillow 3 and is electrically connected to the first circuit board 51 in the first space 321. In the embodiment shown in FIG. 9, a conductive element 21 is extended from the coil 20, and the conductive element 21 is electrically connected to the first electrical connector 7 and penetrates through the waterproof element 4. In this embodiment, the conductive element 21 is generally a flexible wire. In terms of manufacturing, the conductive element 21 is connected to the rigid metal part of the first electrical connector 7 first, and then penetrates through the waterproof element 4.

Please continue referring to FIGS. 7A, 7B and 9. As mentioned above, when the waterproof element 4 is partially disposed in the first insertion hole 3101 as a waterproof structure, the extension part 43 is inserted into the first insertion hole 3101, and the airtight part 41 and the positioning part 42 are disposed on a side of the plate 31 neighboring to the shaft tube 30 (i.e., the side neighboring to the coil 20). A protrusion 3102 is disposed on a side of the inner side 310 of the plate 31 neighboring to the shaft tube 30, and the protrusion 3102 is adjacent to the first insertion hole 3101. Therefore, the positioning part 42 of the waterproof element 4 is engaged with the protrusion 3102 to fix the position of the waterproof element 4. After the positioning part 42 is engaged with the protrusion 3102, the airtight part 41 is located at a radial outer side of the conductive element 21 and has an insulation function. The first insulation board 53 disposed between the first circuit board 51 and the plate 31 has the insertion body 530. The insertion body 530 is disposed corresponding to the first insertion hole 3101, and the insertion body 530 further extends to the position between the plate 31 and the waterproof element 4 so as to fix the relative position of the first electrical connector 7 and the first circuit board 51. The second insulation plate 54 is configured as an insulator between the first circuit board 51 and the second circuit board 52. The first insulation board 53 further includes a guiding part 532 as a protrusion toward to the first circuit board 51. The guiding part 532 is disposed corresponding to the insertion body 530 and the first insertion hole 3101 of the plate 31 for guiding the first electrical connector 7 to make the first electrical connector 7 penetrate the first insulation board 53 and electrically connect the first circuit board 51 easily.

Figure 10:
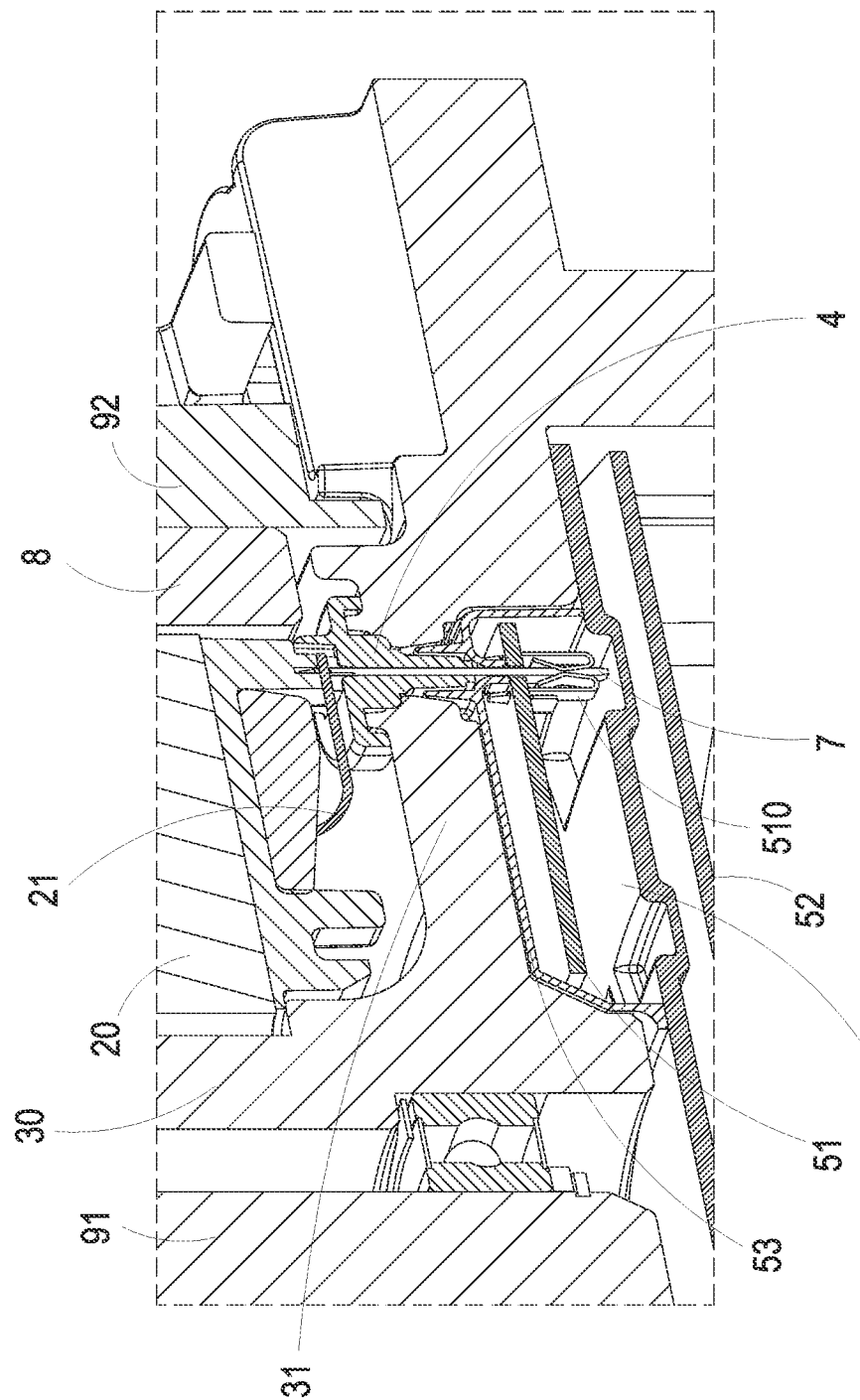
FIG. 10 is a schematic cross-sectional view illustrating a part of the motor according to an embodiment of the present disclosure.

FIG. 10 is a schematic cross-sectional view illustrating a part of the motor 10 according to an embodiment of the present disclosure. Please refer to FIGS. 9 and 10, the conductive element 21 extended out from the coil 20 is electrically connected to the first electrical connector 7. The conductive element 21 is electrically connected to the first electrical connector 7 by the clamping of the clamp 510. The first insulation board 53 is disposed between the plate 31 and the first circuit board 51 as the insulation protection for the electronic components on the first circuit board 51. When the first electrical connector 7 penetrates through the plate 31, the waterproof element 4 is disposed between the first electrical connector 7 and the plate 31. The waterproof element 4 has an insulating function to prevent the first electrical connector 7 and the base 31 from being electrically connected, and also prevent the moisture at the side of the pillow 3 facing the shaft tube 30 from passing through the first through hole 3101 and affecting the circuit boards at the other side of the pillow 3.

Figure 11:
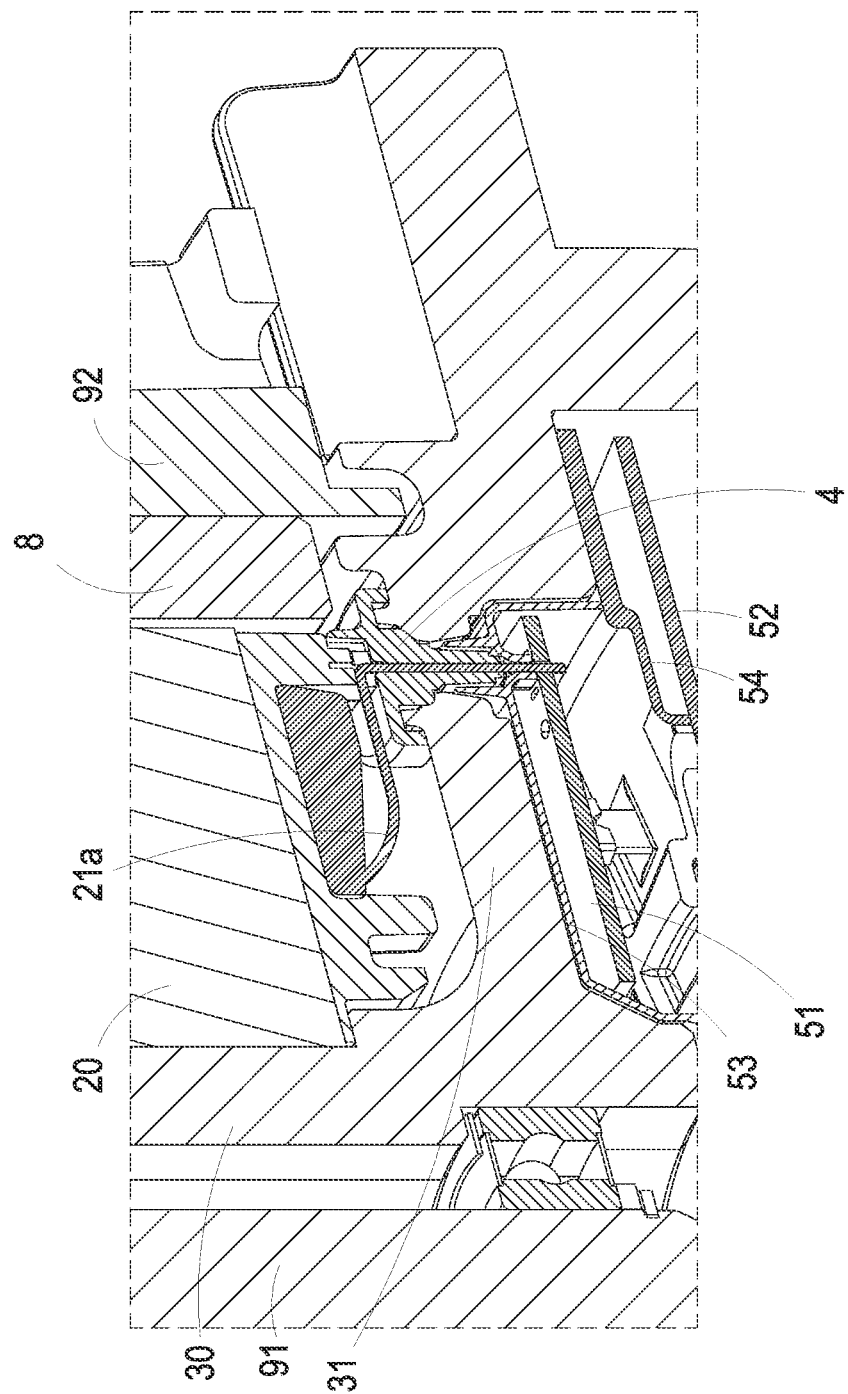
FIG. 11 is a schematic cross-sectional view illustrating a part of the motor according to another embodiment of the present disclosure.

FIG. 11 is a schematic cross-sectional view illustrating a part of the motor 10 according to another embodiment of the present disclosure. Compared with the embodiment shown in FIG. 10, the difference is that the conductive element 21a of FIG. 10 extended out from the coil 20 penetrates through the waterproof element 4 and is electrically connected to the first circuit board 51 directly. The corresponding relations and functions of the other components are the same as those in FIG. 10, and are not redundantly described herein.

Figure 12:
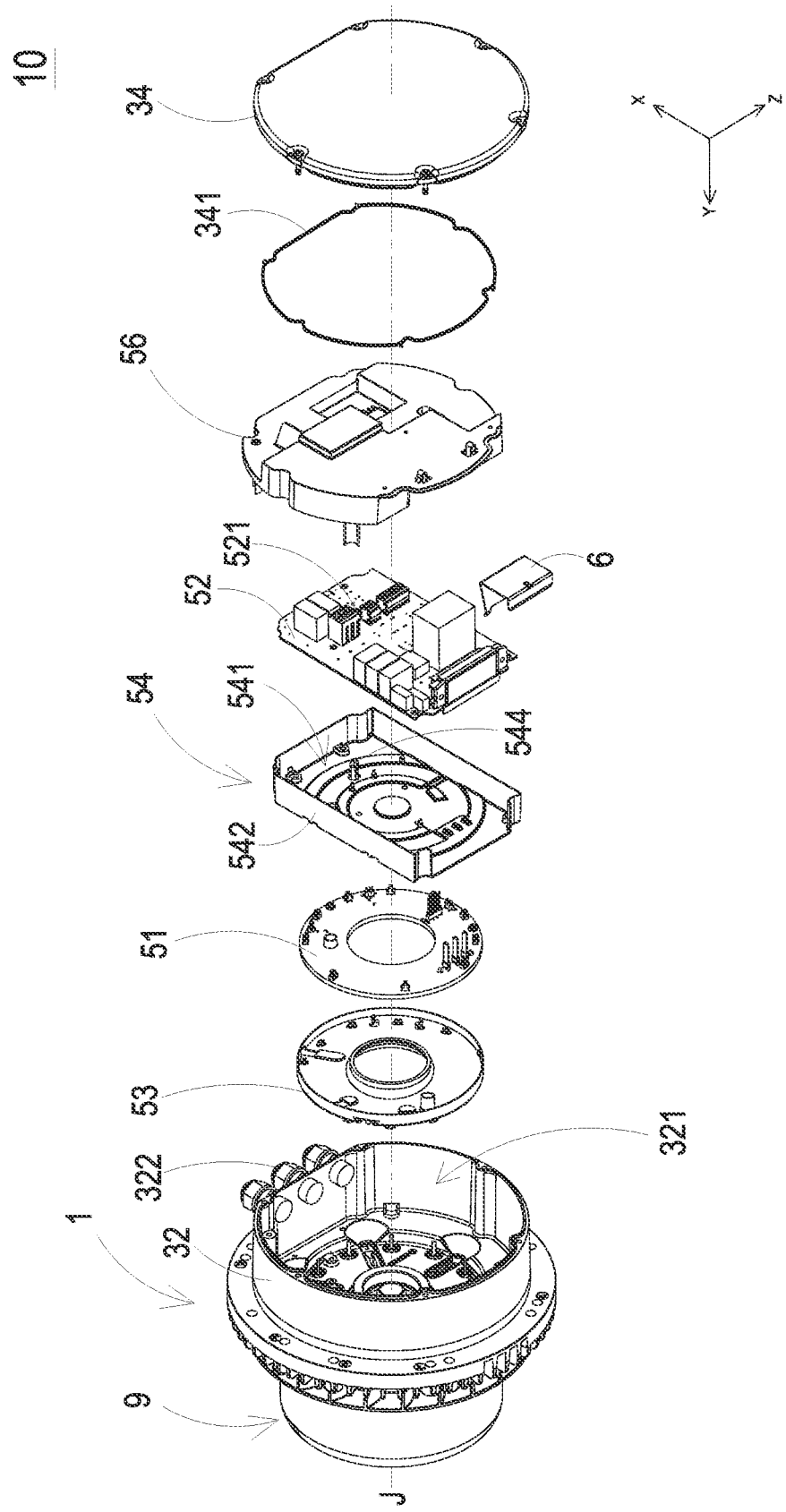
FIG. 12 is a schematic exploded view of the motor according to still another embodiment of the present disclosure.
Figure 13:
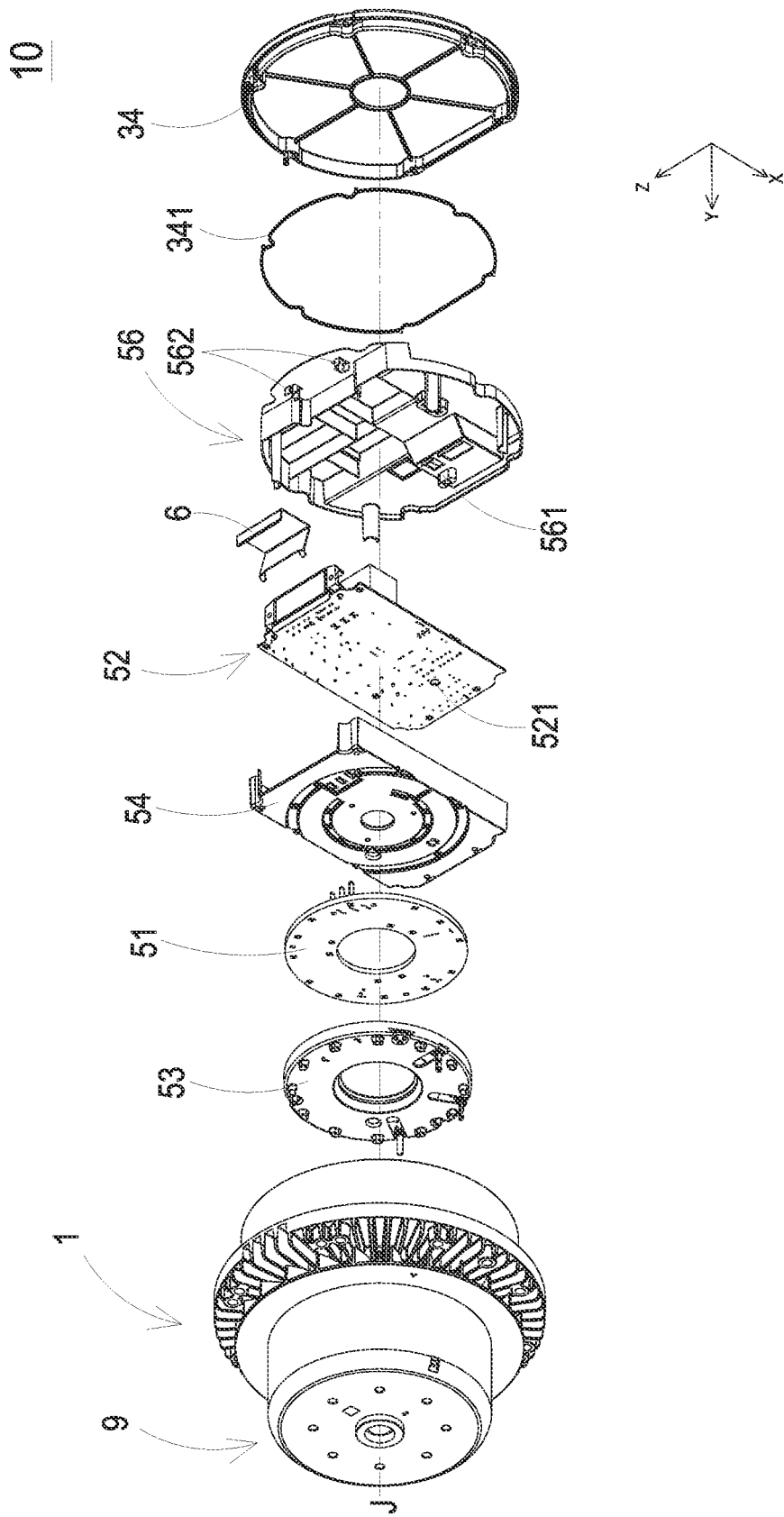
FIG. 13 is a schematic exploded view of the motor of FIG. 12 at another viewing angle.

Please refer to FIGS. 12 and 13. FIG. 12 a schematic exploded view of the motor 10 according to still another embodiment of the present disclosure, and FIG. 13 is a schematic exploded view of the motor 10 of FIG. 12 at another viewing angle. In this embodiment, the motor 10 also includes the stator 1, the rotor 9, the first circuit board 51, the second circuit board 52, the first insulation plate 53 and the second insulation plate 54 which have similar structures and connection relationships with the embodiments described above, so as to be omitted in the following descriptions. In FIGS. 12 and 13, the rotor 9 is assembled on the stator 1 for more clearly showing the structures of other elements. The difference between this embodiment and the embodiment shown in FIGS. 4 and 5 is a third insulation plate 56 is further disposed between the second circuit board 52 and the cover 34 for insulating and protecting the electronic components on the second circuit board 52. In addition, the third insulation board 56 also defines a space for accommodating the second circuit board 52 collaboratively with the second space 541 formed by the side wall 542 of the second circuit board 52.

A protruding element 544 is disposed on the second insulation plate 54, protruded into the second space 541 and extended toward the second circuit board 52 and the third insulation plate 56. A fixing element 561 corresponding to the protruding element 544 is disposed on a side of the third insulation plate 56 facing the second circuit board 52. A penetrating hole 521 corresponding to the protruding element 544 is disposed on the second circuit board 52. Accordingly, as the protruding element 544 passes through the penetrating hole 521 and is combined with the fixing element 561, the second insulation plate 54 and the third insulation plate 56 are assembled together to position the second circuit board 52 in the space therebetween and also provide the insulation protection.

Figure 14:
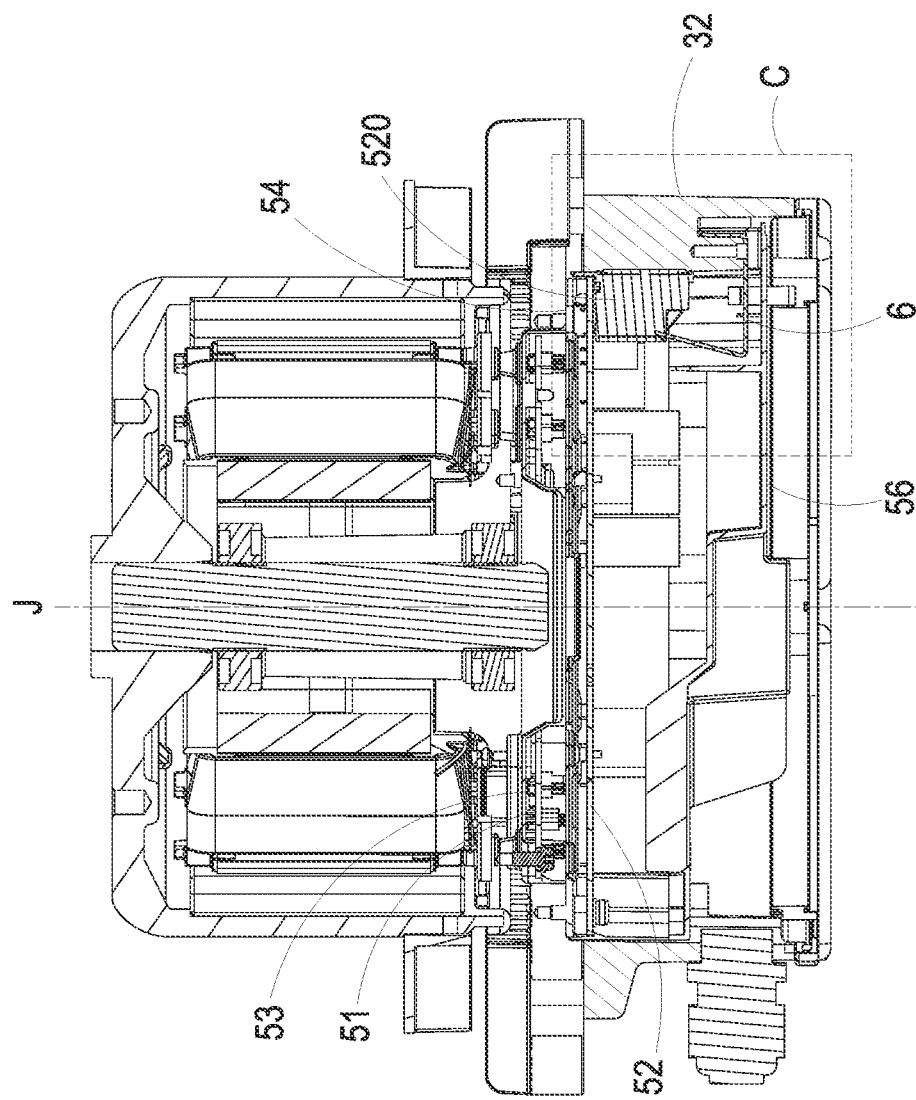
FIG. 14 is a schematic cross-sectional view illustrating the motor of FIG. 12.
Figure 15:
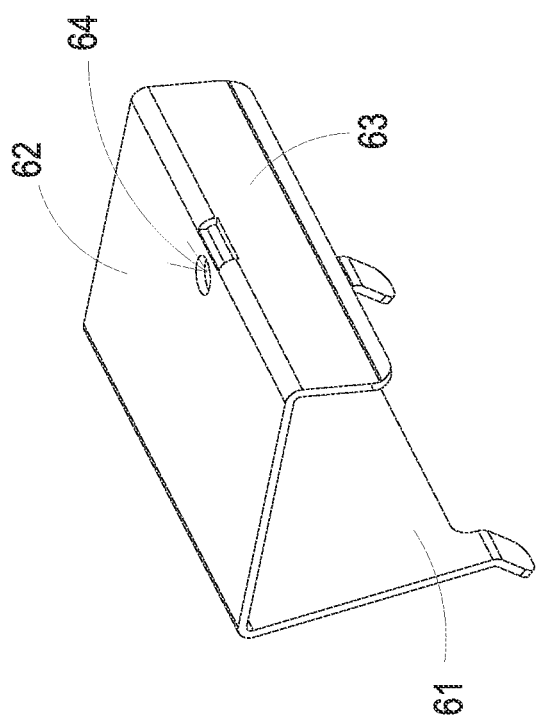
FIG. 15 is a schematic perspective view illustrating a clip in the motor of FIG. 12.

Please refer to FIGS. 14 and 15. FIG. 14 is a schematic cross-sectional view illustrating the motor 10 of FIG. 12, and FIG. 15 is a schematic perspective view illustrating a clip 6 in the motor 10 of FIG. 12. The clip 6 is a single-piece metal and is divided into an abutting portion 61, a holding portion 62 and a clipping portion 63. The abutting portion 61 and the clipping portion 63 are positioned at opposite sides of the holding portion 62 and approximately facing each other. For example, in some embodiments, the clip 6 is formed by bending two ends of a long-shaped metal piece toward the same direction. With the property of one-piece formed metal and the flexibility of thin metal material, the abutting portion 61 and the clipping portion 63 of the clip 6 which are opposite to each other can provide forces in opposite directions to structures and/or objects located therebetween.

Figure 16A:
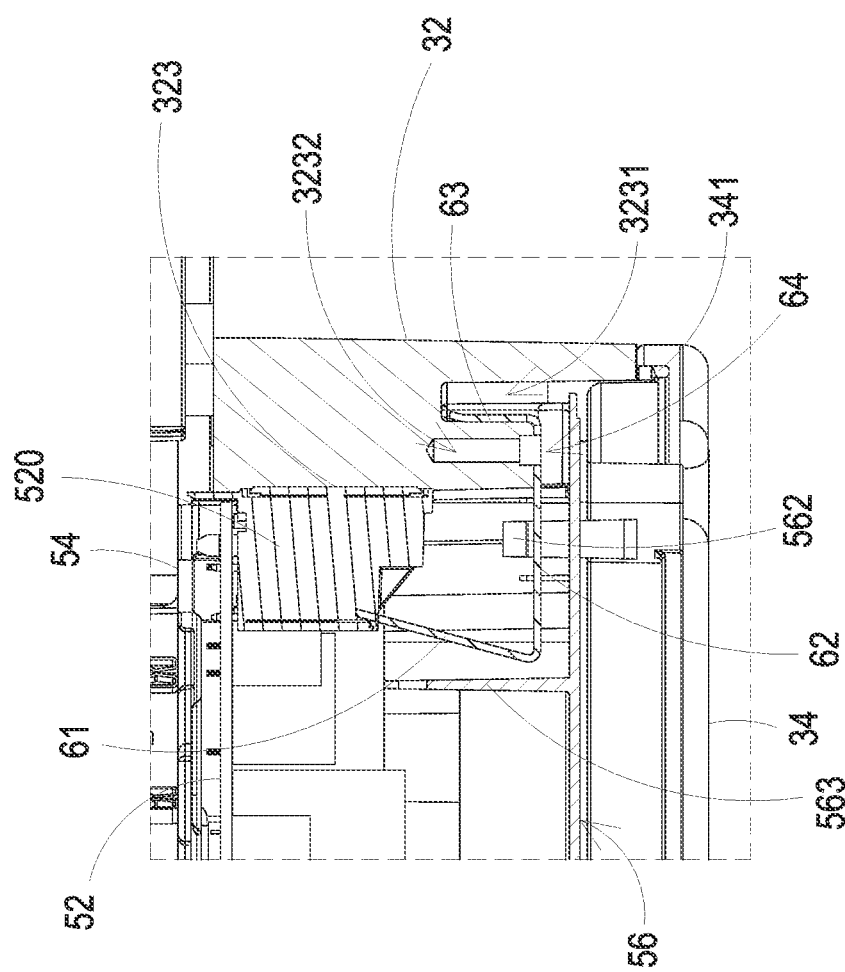
FIG. 16A is a schematic enlarged view of the square C of FIG. 14.

FIG. 16A is a schematic enlarged view of the square C of FIG. 14, and please refer to FIG. 14 and FIG. 16A. The abutting portion 61 of the clip 6 is abutted against the electronic component 520, such as an IGBT (Insulated Gate Bipolar Transistor), on the second circuit board 52. The clipping portion 63 of the clip 6 is stretched into a trough 3231 which is formed between the flat region 323 and the cylinder 32 of the pillow 3. Since the abutting portion 61 and the clipping portion 63 provide forces in opposite directions to keep the structures therebetween staying closed, the electronic component 520 is pushed toward and kept close to the flat region 323 accordingly. As known, the entire pillow 3 is a metal structure, so that the heat produced by the electronic component 520, which is kept close to the flat region 323, can be transmitted to and dissipated through the cylinder 32 and also the pillow 3. Further, since the clip 6 is also made by metal, the heat produced by the electronic component 520 also can be transmitted to and dissipated through the clip 6, thereby enhancing the efficiency of heat dissipation.

Figure 16B:
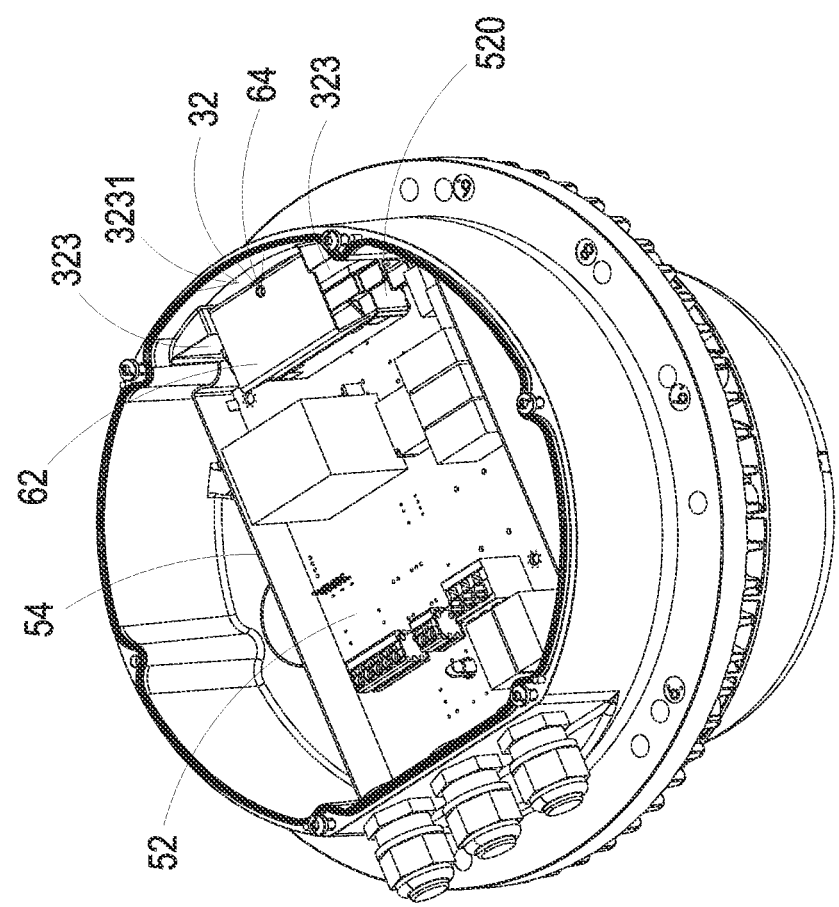
FIG. 16B is a schematic perspective view illustrating a combination of the clip and the cylinder from a direction of the cover of the motor.

Please refer to FIGS. 16A and FIG. 16B. FIG. 16B is a schematic perspective view illustrating a combination of the clip 6 and the cylinder 32 from a direction of the cover 34 of the motor 10. A screwing hole 64 is disposed on the holding portion 62 of the clip 6, and a screwing slot 3232 corresponding to the screwing hole 64 is disposed at a position between the flat region 323 and the trough 3231. Accordingly, by means of penetrating a screw through the screwing hole 64 and into the screwing slot 3232, the clip 6 can be screwed and fixed on the pillow 3, so as to further stabilize the contact between the electronic component 520 and the flat region 323.

Please refer to FIG. 16C. FIG. 16C is a schematic cross-sectional view illustrating a part of a combination of the clip 6, the third insulation plate 56 and the electronic component 520. A retaining element 562 is disposed at the side of the third insulation plate 56 facing the second circuit board 52 for correspondingly engaging with the holding portion 62 of the clip 6. In addition to the clip 6 is screwed on the pillow 3 through the screwing hole 64, the engagement between the holding portion 62 and the retaining element 562 provides a further force for fixing the third insulation plate 56. Consequently, through the protruding element 544 penetrates the penetrating hole 521 of the second circuit board 52 to combine with the fixing element 561, and the clip 6 is screwed with the screwing slot 3232 of the pillow 3 (as shown in FIGS. 16A and 16B) and engaged with the retaining element 562, the second insulation plate 54 and the third insulation plate 56 are fixedly maintained together and form the space therebetween, thereby positioning and protecting the second circuit board 52 therein. Moreover, a division 563 is disposed on the side of the third insulation plate 56 facing the second circuit board. The division 563 is located at a position near the clip 6 and extended toward the second circuit board 52, so that the clip 6 can be substantially separated from other electronic components disposed on the second circuit board 52, thereby preventing the clip 6 made by metal material from affecting other electronic components, such as to cause a short circuit.

In some embodiments, the second insulation plate 54 is benefit of increasing the creepage distance and the electrical clearance from the second circuit board 52 to a charged metal body. In some other embodiments, the third insulation plate 56 prevents objects from entering the second circuit board 52 as the cover 34 is opened. In some other embodiments, an interspace is maintained between the third insulation plate 56 and the cylinder 32 for the need of repair. In some other embodiments, the third insulation plate 56 is formed to have a profile matching to the shapes of electronic components on the second circuit board 52, so that the occupied space can be minimized without altering the dimensions of the pillow 3 and the motor 10.

Please refer to FIGS. 12 and 13. A sealing element 341 is disposed on a periphery of the cover 34 at a side facing the third insulation plate 56. The sealing element 341 seals the first space 321 as the cover 34 is assembled on the cylinder 32 for achieving a waterproof effect. Preferably, the sealing element 341 is made of rubber or plastic, but not limited thereto. The first space 321 formed by the cylinder 32 and the cover 34 accommodates, sequentially in a direction from the plate 31 to the cover 34, the first insulation plate 53, the first circuit board 52, the second insulation plate 54, the second circuit 52, and the third insulation plate 56.

From the above descriptions, the present disclosure provides a motor. By installing the circuit board to replace the wire binding plate of the conventional motor, the steps and complexity of assembling the motor are simplified, and the volume occupied by the motor winding can be eliminated. Furthermore, the waterproof element is disposed in the insertion hole, and the waterproof element is configured for the electrical connector to penetrate therethrough and can achieve the waterproof and insulation functions meanwhile. In addition, in the pillow of the motor, multiple insulation plates are disposed for fixing and protecting the circuit boards, and the clip is also provided for facilitating the fixing and heat dissipation of the electronic component on the circuit board.

While the disclosure has been described in terms of what is presently considered to be the most practical and preferred embodiments, it is to be understood that the disclosure needs not be limited to the disclosed embodiment.

What is claimed is:

1. A motor comprising:
 a stator comprising:
  a pillow comprising a plate, a shaft tube extended from a side of the plate and a cylinder extending axially from an opposite side of the plate relative to the shaft tube, wherein the plate has an inner side neighboring to the shaft tube, and the inner side of the plate has a first insertion hole for a first electrical connector to penetrate therethrough;
  a winding assembly circumferentially disposed on the shaft tube and comprising a conductive element extended out therefrom to connect to the first electrical connector; and
  a cover covering a side of the pillow opposite to the shaft tube;
 a rotor circumferentially disposed at the outside of the winding assembly and comprising a shaft, wherein the rotor is sleeved on the shaft tube and rotates along a central axis;
 a first circuit board disposed at the opposite side of the plate and electrically connected to the first electrical connector;
 a second circuit board electrically connected to the first circuit board and having an electronic component disposed thereon;
 a first insulation plate disposed between the plate and the first circuit board;
 a second insulation plate disposed between the first circuit board and the second circuit board;
 a third insulation plate disposed between the second circuit board and the cover, wherein the third insulation plate is combined with the second insulation plate to form a space for accommodating the second circuit board; and
 a clip abutting against the electronic component and combining with the pillow, respectively,
 wherein the pillow further comprises a flat region concavely and inwardly formed thereon, and the clip is stretched into a trough formed between the flat region and the cylinder.

2. The motor according to claim 1, wherein the cylinder and the plate form a first space for accommodating the first circuit board, the second circuit board, the first insulation plate, the second insulation plate and the third insulation plate therein.

3. The motor according to claim 1, wherein the second insulation plate has a side wall extended axially from a periphery of the second insulation plate.

4. The motor according to claim 1, wherein the clip is a single-piece metal comprising an abutting portion, a holding portion and a clipping portion, and the abutting portion and the clipping portion are positioned at opposite sides of the holding portion and approximately facing each other.

5. The motor according to claim 4, wherein the third insulation plate comprises a retaining element corresponding to the holding portion of the clip.

6. The motor according to claim 4, wherein the abutting portion is abutted against the electronic component on the second circuit board.

7. The motor according to claim 4, wherein the clipping portion is stretched into the trough for combining with the pillow.

8. The motor according to claim 1, wherein a sealing element is disposed on a periphery of the cover at a side facing the third insulation plate.

9. A motor comprising:
 a stator comprising:
  a pillow comprising a plate and a shaft tube extended from a side of the plate, wherein the plate has an inner side neighboring to the shaft tube, and the inner side of the plate has a first insertion hole for a first electrical connector to penetrate therethrough;
  a winding assembly circumferentially disposed on the shaft tube and comprising a conductive element extended out therefrom to connect to the first electrical connector; and a cover covering a side of the pillow opposite to the shaft tube;

a rotor circumferentially disposed at the outside of the winding assembly and comprising a shaft, wherein the rotor is sleeved on the shaft tube and rotates along a central axis;

a first circuit board disposed at an opposite side of the plate relative to the shaft tube and electrically connected to the first electrical connector;

a second circuit board electrically connected to the first circuit board and having an electronic component disposed thereon;

a first insulation plate disposed between the plate and the first circuit board;

a second insulation plate disposed between the first circuit board and the second circuit board;

a third insulation plate disposed between the second circuit board and the cover, wherein the third insulation plate is combined with the second insulation plate to form a space for accommodating the second circuit board; and a clip abutting against the electronic component and combining with the pillow, respectively.

\* \* \* \* \*